UNITED STATES PATENT OFFICE.

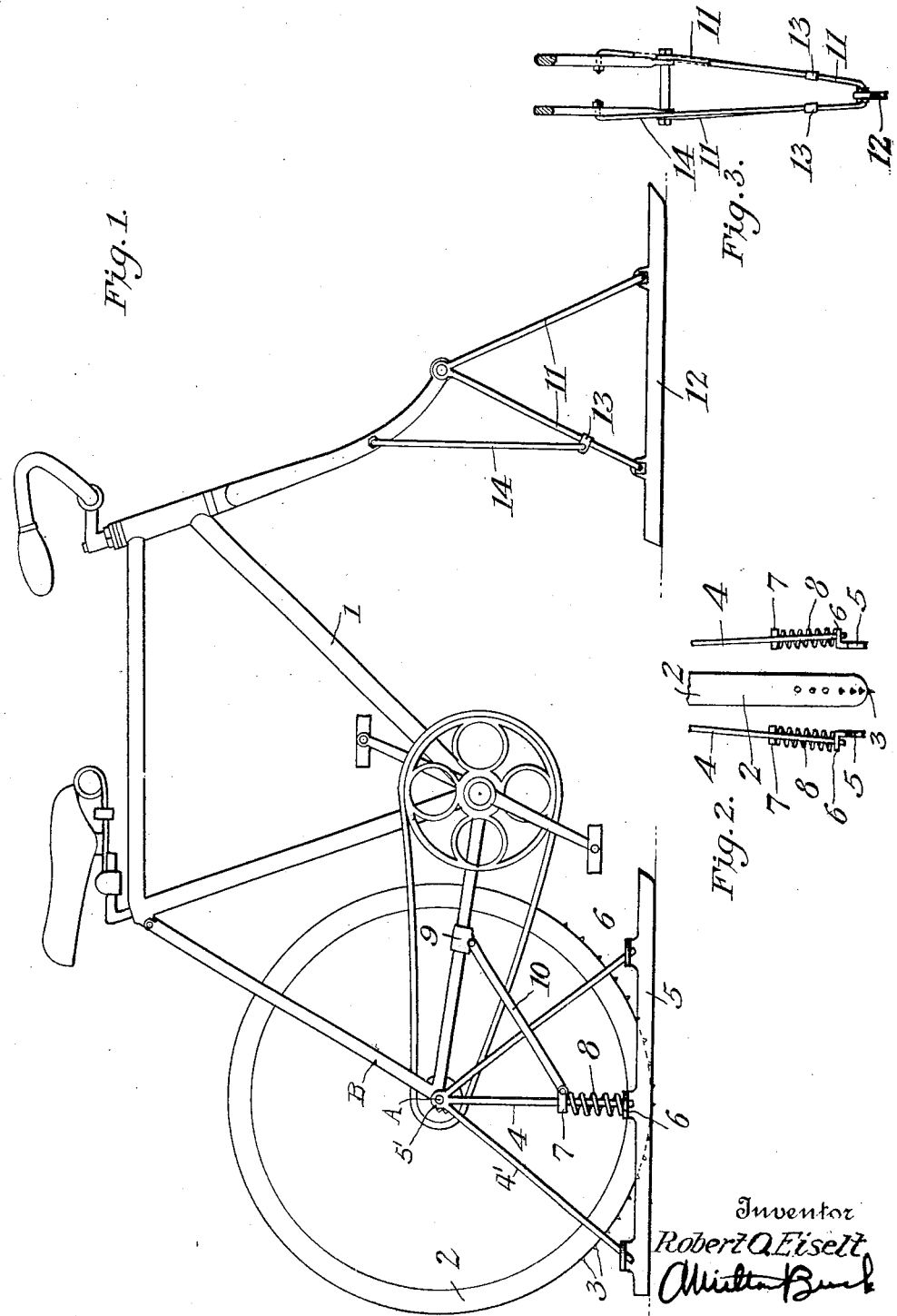

ROBERT OTTO EISELT, OF BLUE EARTH, MINNESOTA.

BICYCLE ATTACHMENT.

1,337,396.
Specification of Letters Patent.
Patented Apr. 20, 1920.

Application filed April 10, 1919. Serial No. 289,175.

*To all whom it may concern:*

Be it known that I, ROBERT O. EISELT, a citizen of the United States, residing at Blue Earth, in the county of Faribault and State of Minnesota, have invented certain new and useful Improvements in Bicycle Attachments, of which the following is a specification.

This invention relates to ice runner attachments for bicycles and it consists in the novel features hereinafter described and claimed.

An object of the invention is to provide an attachment of the character stated which is of simple and durable structure and which may be easily and quickly applied to the frame of a bicycle when it is desired to use the same for riding or moving over ice or frozen snow.

With this object in view the attachment comprises a runner which is applied to the front fork of the frame of the bicycle and runners applied to the rear portion of the frame and located at the opposite sides of the rear wheel. Suitable braces are provided for holding the runners in position and springs are interposed between the rear runners and the frame whereby resiliency is added to the structure and the runners may maintain proper contact with the ice or snow.

In the accompanying drawing:—

Figure 1 is a side view of a bicycle frame with the runners applied.

Fig. 2 is an end view of the rear runners.

Fig. 3 is a similar view of the front runner.

As illustrated in the accompanying drawing the bicycle frame 1 is of usual pattern including the axle A, side frame bars B and the rear wheel 2 journaled therein and operatively connected with the pedal mechanism. Teeth 3 are carried at the periphery of the wheel 2.

The runner attachment comprises a trident shaped frame including a bearing eye 5' from which extends the central rod 4 and the divergent rods 4', 4', the bearing eye 5' being in engagement with the rear axle A as shown. Runners 5 are provided at their upper edges with lugs 6 which slidably receive the lower portions of the rods 4. A sleeve 7 is fixed to one of the rods 4 and a coil spring 8 is interposed between the said collar and one of the lugs 6 and serves to resiliently support the rods and the frame on the runner.

A collar 9 is attached to the rear portion of the frame 1 at a point in advance of the point of connection between the rods 4 and the frame and a rod 10 is pivotally connected with the collar 7 and sleeve 9.

Rods 11 are connected with the lower ends of the branches of the fork of the frame 1 and a runner 12 is connected with the lower ends of the rods 11. Collars 13 are mounted on certain of the rods 11 and brace rods 14 connect the collars 13 with the branches of the fork of the frame of the bicycle.

From the foregoing description taken in conjunction with the accompanying drawing it will be seen that an attachment of simple form is provided and that the same may be readily applied to the frame of a bicycle for transforming the same into a vehicle adapted to be used for travel on ice or snow.

Having described the invention what is claimed is:—

The combination with a bicycle and its rear axle and side bar of a sled attachment comprising a runner having a central and two adjacent laterally extending apertured ears, a trident shaped frame including a bearing eye from which extends a vertically held rod and two divergent side rods, each rod being slidably held in one of said ears, said eye engaging said axle, a sleeve fixed to said side bar, a collar fixed to said vertical rod, a brace bar pivotally connecting said collar and sleeve, and a spring interposed between said collar and central ear and surrounding said central rod, whereby said runner is normally urged outward, as and in the manner shown.

In testimony whereof I affix my signature.

ROBERT OTTO EISELT.